United States Patent
Arguelles et al.

(10) Patent No.: US 9,208,062 B1
(45) Date of Patent: Dec. 8, 2015

(54) PROMOTION DETERMINATION BASED ON AGGREGATED CODE COVERAGE METRICS

(75) Inventors: Carlos A. Arguelles, Shoreline, WA (US); Kiran Chitluri, Seattle, WA (US); Choi Yong Ngo, Issaquah, WA (US); Mihaela Petrescu, Seattle, WA (US); Vijay P. Singh, Seattle, WA (US); Justin Alexander Tisi, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 504 days.

(21) Appl. No.: 13/585,328

(22) Filed: Aug. 14, 2012

(51) Int. Cl.
 G06F 9/44 (2006.01)
 G06F 9/45 (2006.01)
 G06F 11/36 (2006.01)

(52) U.S. Cl.
 CPC .................... G06F 11/3676 (2013.01)

(58) Field of Classification Search
 CPC ..................................... G06F 11/3676
 USPC ......................................................... 717/124
 See application file for complete search history.

(56) References Cited

U.S. PATENT DOCUMENTS

| | | | | |
|---|---|---|---|---|
| 5,651,111 | A * | 7/1997 | McKeeman et al. | 714/38.1 |
| 7,861,226 | B1 * | 12/2010 | Episkopos et al. | 717/124 |
| 8,930,883 | B2 * | 1/2015 | Chaar et al. | 717/101 |
| 2008/0263505 | A1 * | 10/2008 | StClair et al. | 717/101 |
| 2009/0070734 | A1 * | 3/2009 | Dixon et al. | 717/102 |
| 2009/0144698 | A1 * | 6/2009 | Fanning et al. | 717/120 |
| 2011/0004867 | A1 * | 1/2011 | Holden et al. | 717/127 |
| 2011/0055799 | A1 * | 3/2011 | Kaulgud et al. | 717/101 |
| 2011/0197176 | A1 * | 8/2011 | Muharsky et al. | 717/113 |

OTHER PUBLICATIONS

Adler et al. "Code Voverage Analysis in Practice for Large Systems", May 21-28, 2011, ACM, pp. 736-745.*
Beck et al, "JUnit Cookbook", retrieved on Aug 14, 2012 at http://junit.sourceforge.net/doc/cookbook/cookbook.htm, JUnit Cookbook, Sourceforge, 3 pgs.
"Introduction", retrieved on Aug. 14, 2012 at http://cobertura.sourceforge.net/introduction.html, Cobertura Documentation, Sourceforge, 3 pgs.

* cited by examiner

*Primary Examiner* — Marina Lee
(74) *Attorney, Agent, or Firm* — Robert C. Kowert; Meyertons, Hood, Kivlin, Kowert & Goetzel, P.C.

(57) ABSTRACT

Techniques are described for aggregating code coverage data generated from various types of testing of software modules, and automatically determining whether to promote software upwards in a multi-level software deployment hierarchy based on the aggregated code coverage data. In embodiments, a code coverage metric is determined for a software module, and the metric is compared to a set of promotion criteria, including whether the metric meets a predetermined threshold for quality. In some cases, the threshold may be a general threshold, a threshold based on the level of possible promotion, and/or a threshold that is based on an identified category for the software module such as whether the module is a front-end module, a shared module, a legacy module, or a critical module.

25 Claims, 5 Drawing Sheets

PROMOTION DETERMINATION BASED ON AGGREGATED CODE COVERAGE METRICS

BACKGROUND

To varying degrees, software development organizations spend time and resources testing their developed software before releasing it to the public. In situations where extensive, complex software systems are being developed, quality control or quality assurance may consume a large portion of the software development schedule, involving various types of tests being performed on distributed computing devices at various stages in development. However, in many cases software release managers may not have a clear understanding of how much testing has been performed on a piece of software before it is released, potentially leading to a lack of confidence in the quality of the released software and the occurrence of problems (e.g., software bugs, etc.) after release. This in turn may increase business costs for customer service and for patch releases to fix the problems, as well as the potential for lost customers.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
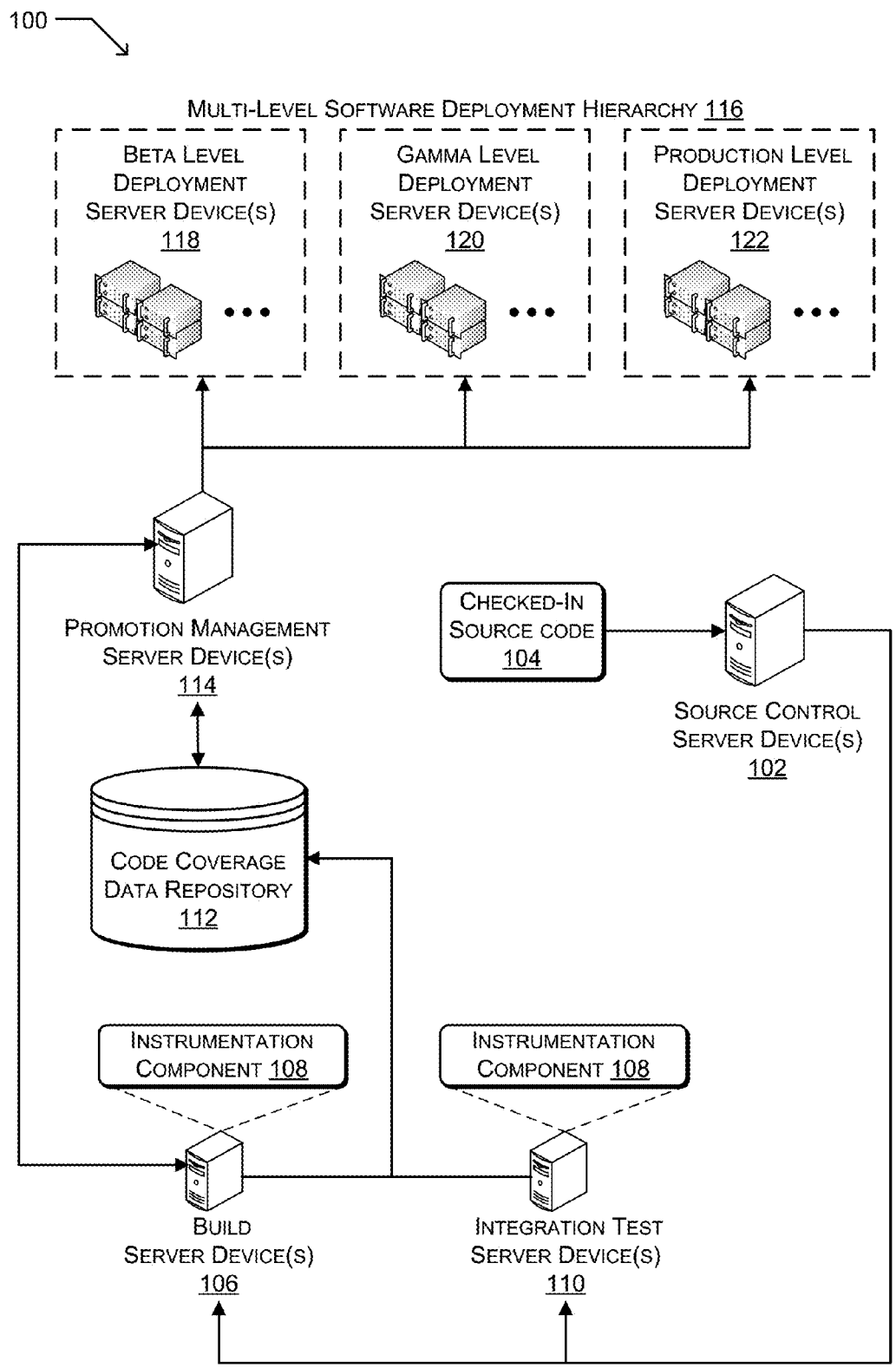
FIG. 1 depicts an example environment in which embodiments may operate to develop aggregated code coverage metrics for a software system.

Embodiments are described for aggregating code coverage metrics generated by a variety of tests exercising portions of a software system or the entire software system, and employing the aggregated metrics to determine whether to promote one or more code modules to a higher level in a multi-level software deployment hierarchy. Understanding exactly how much testing an environment has received before being promoted to a higher level (e.g., to a public release in a production deployment) may pose a challenging task to software development organizations. In many cases, code coverage may provide a quantifiable metric that may inform promotion decisions. As used herein, code coverage provides a metric for how much of a software module has been covered (e.g., executed, exercised, or otherwise touched) by a test running against the software module. Code coverage metrics may be expressed as a number of lines of code executed out of a total number of lines in the module, a percentage of lines executed in a module, or a number or percentage of conditional branches that have been followed while executing a test.

Software engineers may employ various types of tests in testing their code, including but not limited to unit tests, integration tests, environment tests, performance tests, load tests, resilience tests, and so forth. In many cases, software engineers may have an understanding of how much code has been covered during unit testing, but they may have less understanding on the combined coverage of unit tests and the other types of tests. Accordingly, in some cases systems of software modules may be promoted without having received an appropriate level of testing.

In many cases, getting code coverage metrics from unit testing of one or more individual modules (e.g., Java® archive file (JAR), Windows® dynamic-link library (DLL), etc.) file may be relatively straight forward, given that the code for the unit tests and the code being tested may both reside on the same host and/or in a single build project. However, getting code coverage metrics based on system-wide testing (e.g., integration tests, environment tests, performance tests, and the like) for an entire software system (e.g., and entire Web service) may be more complicated, given that the test code may be testing a system that may include many modules and/or may be deployed in a remote environment including many hosts.

Embodiments provide for the instrumenting of software modules on-the-fly when the modules are deployed to a test environment, where the instrumenting enables code coverage metrics to be generated while the software module is being tested. Code coverage metrics generated during the testing of various software modules may then be collected at a central data repository (e.g., a database, server device, etc.), and aggregated to develop an integrated set of code coverage metrics for all the modules in a software system. Such integrated code coverage metrics may then be compared to a set of promotion criteria to determine whether the modules of a software system may be promoted upwards within a multi-level software deployment hierarchy.

In some cases, a determination is made whether a system may be promoted to production (e.g., a highest level in the hierarchy) and thus be accessible to the public. In other cases, a determination is made whether a system may be promoted from a first level to second level, both levels being internally accessible to a software development organization or company. For example, code coverage metrics may be employed to determine whether to promote a software system from a beta level (e.g., a level where the software is tested by one or more particular engineering teams) to a gamma level (e.g., a level where the software is more widely available internally to engineering teams developing other systems).

Embodiments support various promotion criteria. For example, promotion criteria may include comparing a code coverage metric for a particular module (e.g., a percentage or number of lines of code covered) to a predetermined threshold (e.g., such that the module may be promoted if its code coverage is at least 70%). In some cases, the threshold may increase as a system proceeds upward in the software deployment hierarchy. For example, to promote modules to production a higher threshold may be employed than that employed to determine whether to promote modules to the gamma level, the gamma level may have a higher threshold than the beta level, and so forth.

In some embodiments, the threshold may be general to all modules, or may be particularly predetermined based on a category of the module being evaluated. For example, front-end modules may have a higher threshold than back-end modules, given that front-end modules may be more exposed to end users. As another example, legacy modules (e.g., modules that have been running for a certain period of time in production) may have a lower threshold than modules that include newer code, given that an assumption may be made that legacy modules have been more adequately exercised in a production environment and most of their bugs may have come to light already. As another example, shared modules (e.g., library modules or other types of modules that have many cross-dependencies with other modules) may have a higher threshold, given that problems in such modules may have a higher impact on the quality of the system overall.

In some embodiments, promotion criteria may include comparing a current code coverage metric for a module to a previously computed code coverage metric for the same module, and determining whether a change has occurred. In such cases, promotion of the module may proceed if the module's code coverage metric has remained the same or increased, and may be blocked if the module's code coverage metric has decreased. Further, in some embodiments a combination of this delta criterion and the threshold-based criterion may be employed, such that a module may be promoted if its change in metric is higher than a certain threshold (e.g., if the delta in its metric is at least 2%).

Illustrative Environment

FIG. 1 shows an example environment 100 in which embodiments may operate. In embodiments, the various devices and/or components of environment 100 may communicate with one another and with external devices via one or more networks. Such networks may include public networks such as the Internet, private networks such as an institutional and/or personal intranet, or some combination of private and public networks. The networks may also include any type of wired and/or wireless network, including but not limited to local area networks (LANs), wide area networks (WANs), Wi-Fi, WiMax, and mobile communications networks (e.g. 3G, 4G, and so forth). Networks may utilize communications protocols, including packet-based and/or datagram-based protocols such as internet protocol (IP), transmission control protocol (TCP), user datagram protocol (UDP), or other types of protocols. Moreover, the networks may also include a number of devices that facilitate network communications and/or form a hardware basis for the networks, such as switches, routers, gateways, access points, firewalls, base stations, repeaters, backbone devices, and the like.

In some embodiments, environment 100 includes one or more source control server device(s) 102. Such server devices, as well as the other server devices depicted in FIG. 1, may include any type of computing device that is able to communicate with other devices over a network, including but not limited to network servers, application server, web servers, database servers, rack-mounted enterprise servers, desktop computers, personal computers, laptop computers, tablet computers, eBook readers, wearable computers, mobile phones, automotive computers, thin clients, terminals, personal data assistants (PDAs), game consoles, mobile gaming devices, and the like. In some embodiments, source control server device(s) 102 host and/or execute one or more source control applications that enable check-ins of source code by software engineers, and enable management of multiple branches, versions, builds, and/or releases of source code. For example, such source control applications may include internally developed source control tools, or commercial software products such as Perforce® by Perforce Software, Inc.

In some embodiments, software engineers may check-in source code to source control server device(s) 102. The checked-in source code 104 may be copied to build server device(s) 106, which operate to build a software system from one or more modules and perform one or more unit tests at build time. Although build server device(s) 106 are depicted as separate from source control server device(s) 102, in some embodiments the build and source control functions may be combined on a single server or cluster of servers.

In some embodiments, build server device(s) 106 may include an instrumentation component 108 to instrument one or more software modules prior to unit testing. Instrumentation component 108 may add functionality into a software module, either at the source code, byte code, or machine code level, to output code coverage data while a test is being run against the software module. Accordingly, in some embodiments instrumentation component 108 may operate to instrument one or more checked-in software modules such that when unit tests are run for the instrumented software modules, code coverage data is output to a code coverage data file.

In some embodiments, checked-in source code may also be copied to integration test server device(s) 110, which are configured to perform integration tests (e.g., tests of an integration of two or more software modules), environment tests (e.g., tests of an entire system of integrated software modules), performance tests, load tests, resilience tests, and/or other types of tests that cover a broader portion of the system than unit tests. In some embodiments, build server device(s) 106 build the software system of one or more instrumented components and deploy the built system to integration test server device(s) 110. In other embodiments, integration test server device(s) 110 may operate to instrument software modules (e.g., using instrumentation component 108) and build the software system from the instrumented modules. In either case, when testing of the system is performed on integration test server device(s) 110, code coverage data files may be generated that include code coverage data created during testing of the instrumented system.

During and/or after tests are performed on build server device(s) 106 and/or integration test server device(s) 110, the generated code coverage data files are sent to code coverage data repository 112, which collects raw code coverage data generated from testing throughout environment 100. In some cases, environment 100 may include hundreds or thousands of server devices performing testing, so code coverage data repository 112 may receive large amounts of data on a more or less ongoing basis. Embodiments may support any type of data storage or database technology for use in code coverage data repository 112.

Environment 100 may also include promotion management server device(s) 114. In some embodiments, promotion management server device(s) 114 perform operations to aggregate and/or integrate the raw code coverage data stored in code coverage data repository 112 (described further with regard to FIG. 4), and determine whether to promote one or more software modules based on the application of one or more promotion criteria to the aggregated code coverage data (described further with regard to FIG. 5). In some embodiments, promotion management server device(s) 114 include functionality to automatically decide whether to promote a system of code modules upward within a multi-level software deployment hierarchy 116. The multi-level software deployment hierarchy 116 may include multiple levels of software deployment. In the example of FIG. 1, the hierarchy 116 includes three levels of software deployment—a beta level, which includes beta level deployment server device(s) 116; a gamma level, which includes gamma level deployment server device(s) 118; and a production level, which includes production level deployment server device(s) 120. Other embodiments may support more or fewer possible levels in the multi-level software deployment hierarchy 116.

The server devices at each level may include web servers, application servers, persistence level servers, middleware servers, or other types of servers for providing a software system such as an e-commerce web site or collection of sites. Although hierarchy 116 is depicted in FIG. 1 as including three levels, embodiments are not so limited and may incorporate any number of software deployment levels. In some embodiments, promotion management server device(s) 114 communicate with build server device(s) 106, or with other devices of environment 100, to receive built software modules to be promoted from one level to another in the multi-level software deployment hierarchy 116.

Illustrative Computing Device Architecture

Figure 2:
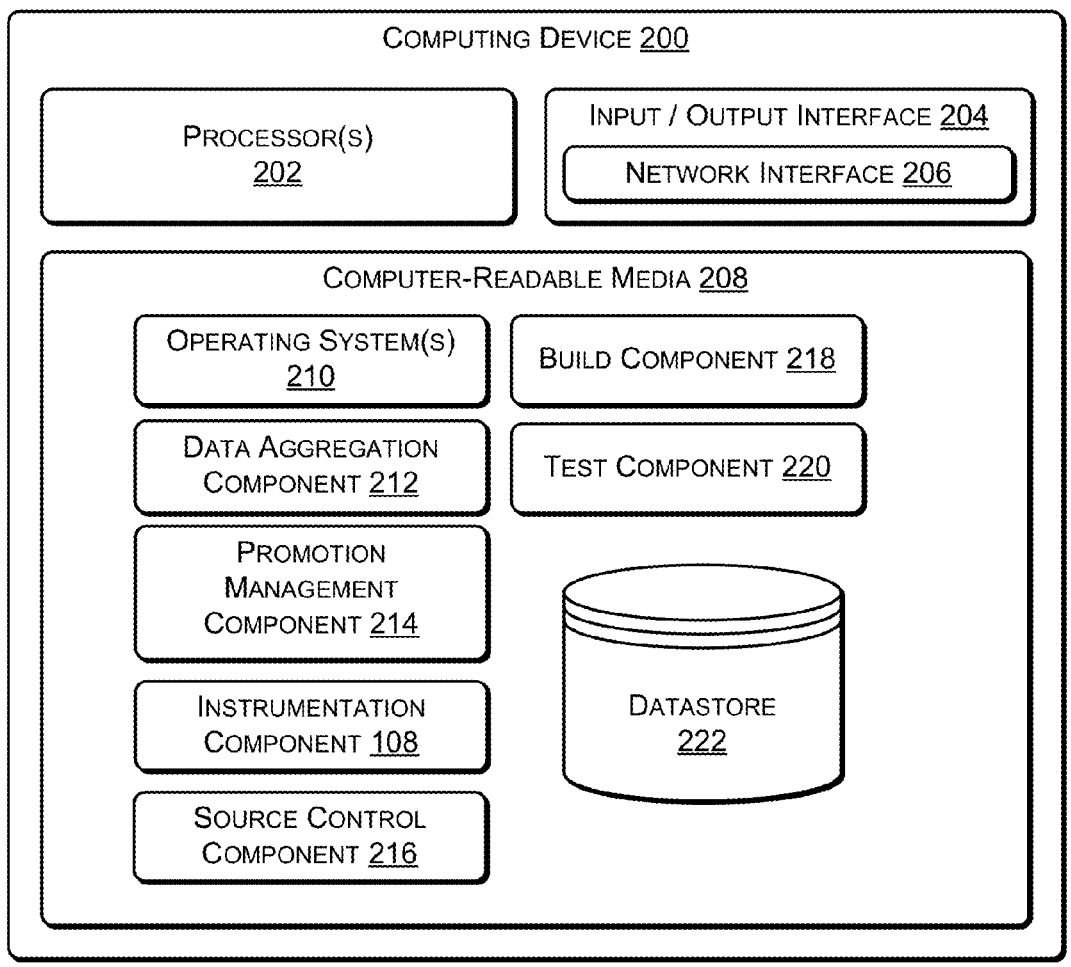
FIG. 2 depicts an example computing device for managing promotion based on aggregated code coverage metrics, according to embodiments.

FIG. 2 depicts an example computing device 200 that may be used to implement various embodiments described herein. For example, computing device 200 may provide an example computing system architecture for promotion management server device(s) 114, or other devices of environment 100. In embodiments, computing device 200 includes one or more processors 202. Processor(s) 202 may be implemented as hardware, software, or some combination thereof. Processor(s) 202 may also include computer-executable, processor-executable, and/or machine-executable instructions written in any suitable programming language to perform various functions described herein.

Computing device 200 may further include one or more input/output interfaces 204 to allow computing device 200 to communicate with other devices such as user input peripheral devices (e.g., a keyboard, a mouse, a pen, a game controller, a voice input device, a touch input device, gestural input device, and the like), and/or output peripheral devices (e.g., a display, a printer, audio speakers, a haptic output, and the like).

Input/output interface 204 may also include one or more network interfaces 206 to enable communications between computing device 200 and other networked devices such as those depicted in FIG. 1. Such network interfaces 206 may include one or more network interface controllers (NICs) or other type of transceiver device to send and receive communications over a network. Computing device 200 may also include one or more busses and/or other internal communications hardware or software that allow for the transfer of data and/or internal communications between the various components of computing device 200.

As shown in FIG. 2, computing device 200 includes a computer-readable media 208 (e.g., memory), which may include volatile memory such as random access memory (RAM), static random access memory (SRAM), dynamic random access memory (DRAM), cache memory, and the like. Computer-readable media 208 may also include non-volatile memory such as read only memory (ROM), flash memory, and the like. Moreover, computer-readable media 208 may also include cache memory, active memory, and/or physical memory used by various processes that run based on instructions and data stored on computing device 200.

Computer-readable media 208 includes computer-readable storage media, which is a form of computer-readable media. Computer-readable storage media may include non-removable storage (e.g., a hard drive) and/or removable storage including magnetic disk storage, optical disk storage, tape storage, storage arrays, storage area networks, network attached storage, cloud storage, and the like. Disk drives and associated computer-readable media may provide non-volatile storage of computer readable instructions, data structures, program modules, and other data for the operation of computing device 200.

As used herein, computer-readable media includes two distinct types of media: storage media and communications media. With regard to storage media, embodiments may be provided as a computer program product stored on a non-transitory computer-readable or machine-readable storage medium. Computer-readable or machine-readable storage media includes tangible and/or non-transitory forms of media such as volatile and/or non-volatile memory. Such media may be included in a device and/or hardware component that is part of a device or external to a device, including but not limited to RAM, SRAM, DRAM, ROM, erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, or any other non-transmission memory, device, and/or medium that can be used to store and maintain information for access by a computing device. Computer storage media may store information in the form of instruction sets, data structures, applications, program modules and the like, that may be used to program a computing device or processor and thus enable a computing device or processor to perform actions. The stored information may be stored in a compressed or uncompressed form.

In contrast to the tangible storage media described above, communication media is non-tangible (e.g., transitory) and may include data (e.g., computer instruction sets, data structures, program modules, and the like) transmitted in a modulated data signal such as a carrier wave. Embodiments may also be provided as a computer program product including a transitory machine-readable signal (in compressed or uncompressed form). Examples of machine-readable signals, whether modulated using a carrier or not, include but are not limited to signals that a computer system or machine hosting or running a computer program can be configured to access, including signals downloaded through the Internet or other networks. For example, distribution of software may be via Internet download. Thus, tangible storage media does not include non-tangible communication media.

In some embodiments, computer-readable media 208 includes one or more executing operating systems (OS) 210, and one or more stored and/or executing processes including components, programs, or applications that are loadable and executable by processor(s) 202. In the example shown, computer-readable media 208 includes a data aggregation component 212 that operates to integrate and/or aggregate raw code coverage data generated from testing (as described with reference to FIG. 4). Computer-readable media 208 may also include a promotion management component 214 that operates to apply one or more promotion criteria to the aggregated code coverage data for one or more software modules, determine whether to promote the software modules based on whether the criteria are satisfied, and/or promote the software by deploying the software system to servers at a particular level in the multi-level software deployment hierarchy 116 (as described further with regard to FIG. 5).

In some embodiments, computer-readable media 208 includes instrumentation component 108 that operates to instrument a software module so that code coverage data is generated when the software module is executed. In some embodiments, instrumentation component 108 is provided as part of a software testing utility such as Cobertura™ Instrumentation of the software may be performed at the source code level, at an intermediate language code level (e.g., byte code for java code, or opcodes for C# code), and/or at the machine code level for compiled code.

In some embodiments, computer-readable media 208 may also include a source control component 216 (e.g., where computing device 200 represents source control server device(s) 102), such as Perforce®. Computer readable media 208 may also include a build component 218 to build, compile, link, and/or otherwise process one or more software modules for unit testing, and/or to build a software system out of multiple software modules for more system-wide testing. Computer-readable media 208 may also include a test component 220 to perform any of the various kinds of testing described herein.

In some embodiments, computer-readable media 208 also includes a datastore 222 (e.g., a database) to store information for operations of computing device 200. For example, datastore 222 may store data used for operations of the components, applications, and/or operating systems in computer-readable media 208. In some embodiments, datastore 222 may also store raw code coverage data received generated from testing, integrated or aggregated code coverage data for one or more software modules, computed code coverage metrics, and/or information regarding currently software deployment status within the multi-level software deployment hierarchy 116. In some embodiments, some or all of the data used for operations of computing device 200 may be stored in a data storage device that is external to computing device 200.

Illustrative Process

Figure 3:
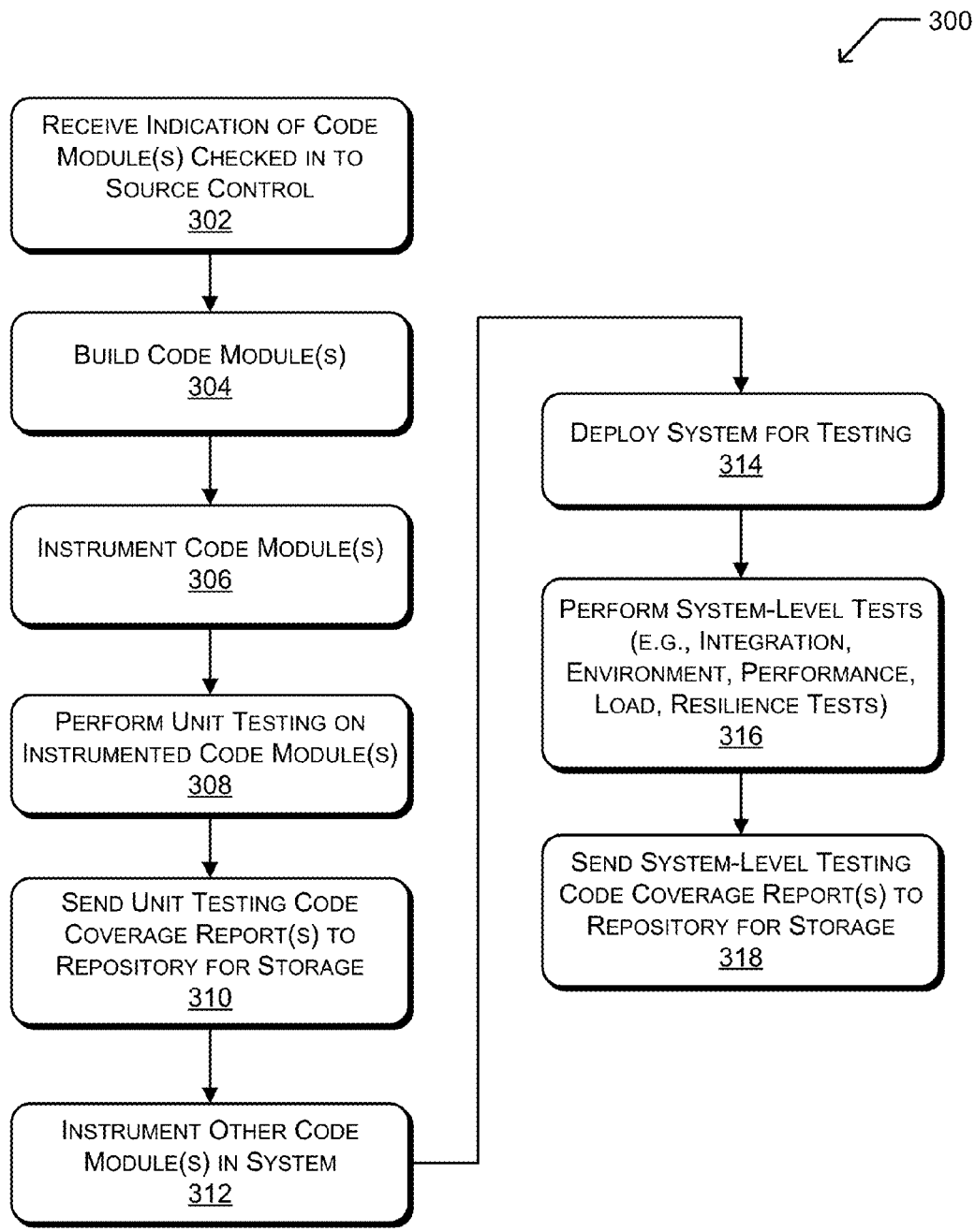
FIG. 3 depicts a flow diagram of an example process for receiving code coverage metrics, according to embodiments.
Figure 4:
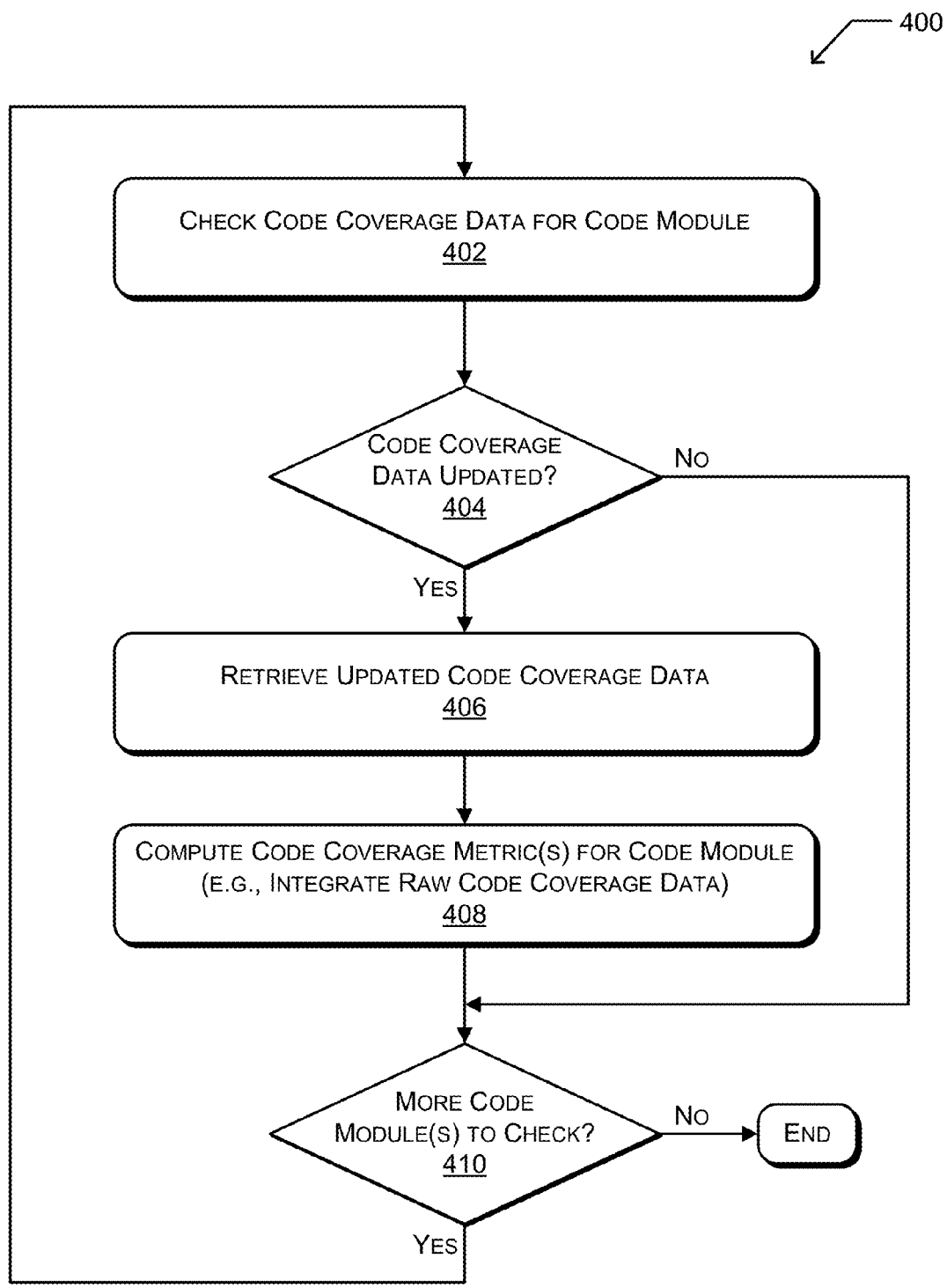
FIG. 4 depicts a flow diagram of an example process for integrating or aggregating code coverage metrics, according to embodiments.
Figure 5:
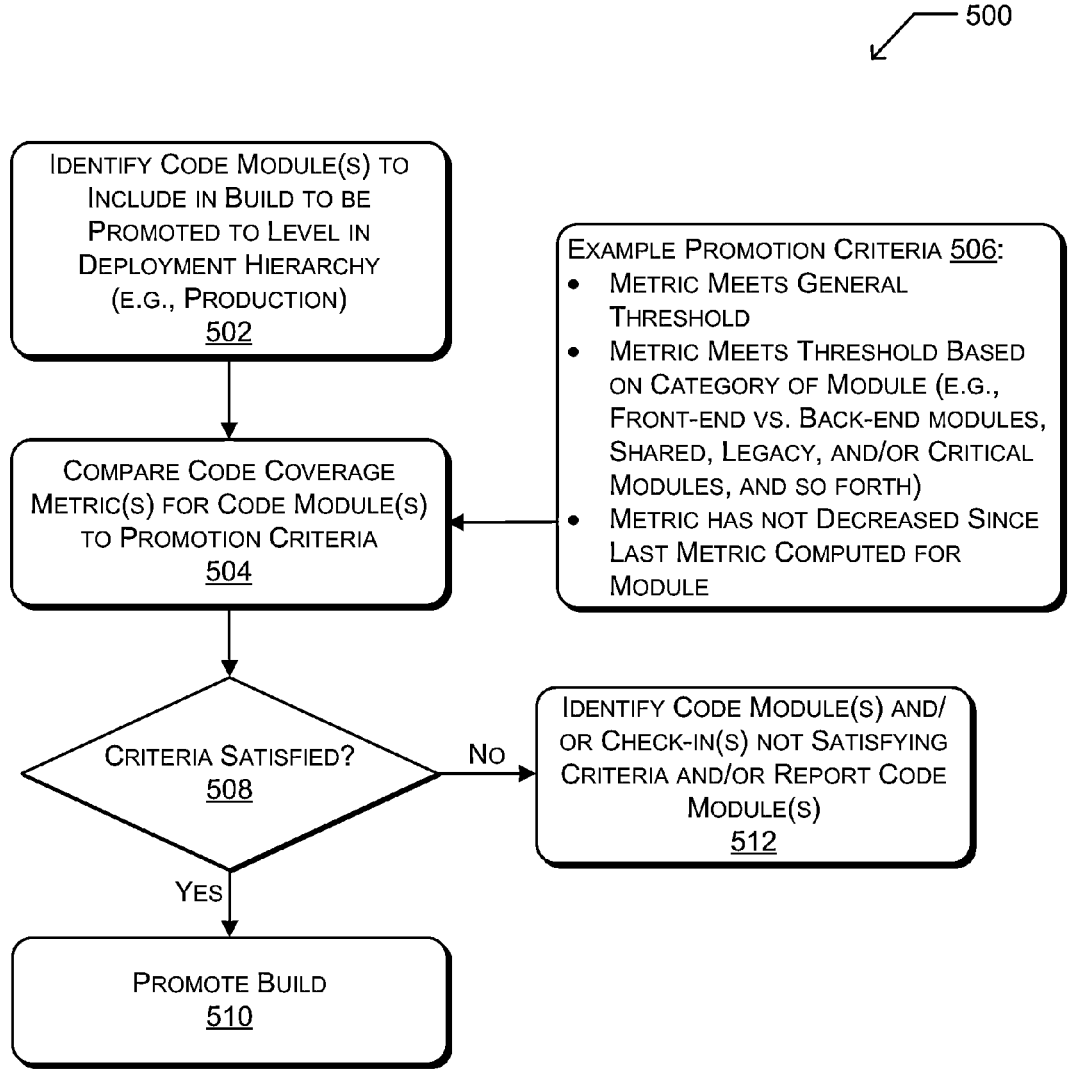
FIG. 5 depicts a flow diagram of an example process for making code promotion decisions based on aggregated code coverage metrics, according to embodiments.

FIGS. 3-5 depict flowcharts for an example processes in accordance with various embodiments. The operations of the example processes are illustrated in individual blocks and summarized with reference to those blocks. The processes are illustrated as logical flow graphs, each operation of which may represent one or more operations that can be implemented in hardware, software, or a combination thereof. In the context of software, the operations represent computer-executable instructions stored on one or more computer-readable storage media that, when executed by one or more processors, enable the one or more processors to perform the recited operations. Generally, computer-executable instructions include routines, programs, objects, modules, components, data structures, and the like that perform particular functions or implement particular data types. The order in which the operations are described is not intended to be construed as a limitation, and any number of the described operations may be executed in any order, combined in any order, subdivided into multiple sub-operations, and/or executed in parallel to implement the described processes.

FIG. 3 depicts a flow diagram of an illustrative process 300 for collecting raw code coverage data according to embodiments. In some embodiments, process 300 may be performed on one or more of the devices shown in FIG. 1, such as build server device(s) 106 and/or integration server device(s) 110. At 302, an indication may be received of one or more code modules or software modules checked in to source control by software engineers. Code modules may include a portion of code of any size and at any level in a software system including but not limited to methods, functions, classes, objects, modules such as JARs or DLLs, packages of multiple classes (e.g., java packages), or whole systems.

At 304, one or more of the checked-in code modules are built. In some embodiments, building may include compiling, linking, or other operations to generate machine-executable code from the source code of the code module(s). In cases where source code is written in java, C#, or another language that supports an intermediate (e.g., byte-code) representation of the code that is interpretable by a virtual machine (VM) or other runtime process, building may include compiling the source code of the code module(s) to generate the intermediate language. At 306, the built code module(s) may be accessed and instrumented (e.g., through operations of instrumentation component 108). In some embodiments, where instrumentation is performed on source code, instrumentation of code module(s) may be performed prior to building the code module(s).

At 308, one or more unit tests may be performed on the instrumented code modules. In embodiments, unit tests may operate against one or more portions of code such as particular function(s) or class(es), and may be implemented using a code testing package such as JUnit™. At 310, the code coverage reports generated from unit testing on the instrumented code may be sent to the central code coverage repository (e.g., repository 112).

At 312, if not all of the code modules of a software system have been instrumented, then one or more additional code modules may be instrumented. At 314, a software system of instrumented software module(s) may be deployed to a server for integration testing, environment testing, performance testing, load testing, resilience testing, and/or other types of testing. At 316, such system-level forms of testing may be performed, and one or more code coverage reports may be generated during such testing. At 318, the one or more system-level testing code coverage reports may be sent to the repository.

Table 1 shows an example of a code coverage report including raw data generated from testing one or more packages each including one or more classes. Such a report may include an identification of the software module being tested (e.g., in this example a java package), a number of classes or other subdivisions of the module. As shown in Table 1, the report may also include coverage data describing a number of portions of the code covered by the tests that have been run against the code. In some embodiments, code coverage data includes line coverage data, such as a percentage of lines of code covered by the test, and/or a ratio of the number of covered lines to total lines in the module. The report may also include data for branch coverage, such as the percentage of code branches covered by the test, and/or a ratio of the number of covered branches to total branches in the module. As used herein, a code branch describes a flow control path through code, such as that controlled by a conditional statement in the code (e.g., if statements, try/catch blocks, and so forth).

TABLE 1

| Package Name | # of Classes | Line Coverage % | Line Coverage Number | Branch Coverage % | Branch Coverage Number |
|---|---|---|---|---|---|
| xyz.web.hadoop.config | 17 | 90 | 175/193 | 80 | 323/400 |
| xyz.web.hadoop.driver | 23 | 93 | 143/153 | 78 | 33/42 |
| xyz.web.hadoop.input | 4 | 91 | 413/450 | 86 | 69/80 |
| xyz.web.hadoop.io.resource | 18 | 89 | 78/87 | 100 | 20/20 |
| xyz.web.hadoop.mapper | 32 | 0 | 0/3 | | 0/0 |
| xyz.web.proc | 15 | 84 | 118/140 | 80 | 8/10 |
| xyz.web.proc.message | 3 | 100 | 39/39 | 100 | 22/22 |

FIG. 4 depicts a flow diagram of an illustrative process 400 for aggregating and/or integrating raw code coverage data to determine a code coverage metric for one or more modules, according to embodiments. In some embodiments, process 400 may be performed on one or more of the devices shown in FIG. 1, such as promotion management server device(s) 114. At 402, code coverage data for a particular code module may be examined, and a determination may be made at 404 whether the code coverage data has been updated for the particular code module since the last time a code coverage metric was computed for the code module. In some embodiments, a list or other data structure may be kept listing each code module, code coverage metric(s) for each module, and/or a date/time stamp indicating the most recent computation of a code coverage metric for each module. If it is determined that updated raw code coverage data for a module has been received since the last date/time when a metric was computed for the module, a determination may be made that the metric is to be recomputed using the more recently received data.

If it is so determined at 404, at 406 the updated code coverage data is retrieved from storage. At 408 one or more code coverage metrics may be computed for the code module, by integrating the raw code coverage data that indicates coverage of lines of code for the module. In some embodiments, the code coverage metric may indicate number of lines of code and/or a percentage of the lines of code in the module that were exercised by all tests run against that module, including units tests of the module as well as more system-wide tests that hit the module. The code coverage metric may also indicate the number and/or percentage of code branches in the module that were exercised by all tests run against that module. Because all the available testing data is used to generate and/or update the code coverage for a code module, embodiments may be described as integrating or aggregating code coverage data.

At 410, a determination is made whether there are additional code modules to check and/or possibly recalculate a code coverage metric. If so, process 400 may loop back to 402 to check another module. If not, process 400 ends.

FIG. 5 depicts a flow diagram of an illustrative process 500 for automatically make software promotion decisions based on the aggregated code coverage data, according to embodiments. In some embodiments, process 500 may be performed on one or more of the devices shown in FIG. 1, such as promotion management server device(s) 114. At 502, an identification may be made of one or more code modules to be included in a build of a software system (e.g., a web service or other application) that may be promoted within the deployment hierarchy. In some embodiments, a build may include a plurality of code modules each of which have a particular build number or version number, and may include source code from one or more development branches in a source control tree.

At 504, the latest code coverage metrics for each of the code modules in the build may be evaluated and compared to one or more promotion criteria 506. In some embodiments, promotion criteria may include comparing a code coverage metric for a particular module to a predetermined threshold (e.g., such that the module may be promoted if its code coverage is at least 70%). In some cases, the threshold may increase as a system proceeds upward in the software deployment hierarchy. For example, to promote modules to the production level, a higher threshold may be employed than that employed to determine whether to promote modules to the gamma level, the gamma level may have a higher threshold than the beta level, and so forth. In this way, embodiments may impose increasing standards of quality for code promotion as the software makes its way to production.

Moreover, in some embodiments the threshold may be particularly predetermined based on a category of the module being evaluated. For example, front-end modules may have a higher threshold than back-end modules, given that front-end modules may be more exposed to end users. As another example, legacy modules (e.g., modules that have been running for a certain period of time in production) may have a lower threshold than modules that include newer code, given that an assumption may be made that legacy modules have been more adequately exercised in a production environment and most of their bugs may have come to light already. As another example, shared modules (e.g., library modules or other types of modules that have many cross-dependencies with other modules) may have a higher threshold, given that problems in such modules may have a higher impact on the quality of the system overall.

Moreover, in some embodiments the threshold may be determined for a particular module or set of modules based on a determination that the module(s) are critical. As used herein, a critical module describes a module in which a downtime, failure, bug, and/or lower-than-expected performance may lead to a loss of sales, loss of business, loss of user traffic to a site, loss or compromise of data (e.g., personal, financial, private, and/or sensitive data), compromise of user privacy, security breach, or other degradations of features that are deemed critical to the performance of a software system.

In some embodiments, promotion criteria may include comparing a current code coverage metric for a module to a previously computed code coverage metric for the same module, and determining whether a change has occurred. In such cases, promotion of the module may proceed if the module's code coverage metric has remained the same or increased, and may be blocked if the module's code coverage metric has decreased. Further, in some embodiments a combination of this delta criterion and the threshold-based criterion may be employed, such that a module may be promoted if its change in metric is higher than a certain threshold (e.g., if the delta in its metric is at least 2%). Further, embodiments may support other types of criteria to determine whether to promote code, based on any of the information included in the raw code coverage reports.

At 508, the criteria are applied to the code coverage metric(s), and if the criteria are satisfied, at 510 the build is promoted and deployed to the desired level in the multi-level software deployment hierarchy 116. If the criteria are not satisfied, at 512 an analysis is performed to identify those code modules that do not satisfy the criteria. In such cases, an audit may be performed in source control to identify one or more check-ins that led to the non-compliant code modules, and additional testing may be recommended to provide greater test coverage for the non-compliant modules.

CONCLUSION

Although the techniques have been described in language specific to structural features and/or methodological acts, it is to be understood that the appended claims are not necessarily limited to the specific features or acts described. Rather, the specific features and acts are disclosed as example implementations of such techniques.

What is claimed is:

1. A computer-implemented method, comprising:
  receiving a plurality of unit code coverage reports that include test data describing lines of code covered by unit tests of one or more software modules;
  receiving system code coverage reports that include test data describing interactions between the one or more software modules and system software, wherein the one or more software modules are integrated into the system software, and wherein the test data further describes test results from the integration of the one or more software modules into the system software;

computing code coverage metrics for the one or more software modules, wherein the code coverage metrics are based at least on both the plurality of unit code coverage reports and the system code coverage reports;

promoting at least one of the one or more software modules from a first level to a second level within a software deployment hierarchy, wherein said promoting is based at least in part on a determination that a code coverage metric of the code coverage metrics for the at least one of the one or more software modules satisfies one or more promotion criteria; and reporting at least one other of the one or more software modules, wherein said reporting is based at least in part on a determination that a code coverage metric of the code coverage metrics for the at least one other of the one or more software modules does not satisfy the one or more promotion criteria.

2. The method of claim 1, further comprising:
instrumenting the one or more software modules prior to unit testing of the one or more software modules; and
instrumenting the system software prior to testing the system software integrating the one or more software modules.

3. The method of claim 1, wherein the one or more promotion criteria include the code coverage metric being at least a code coverage threshold level, and wherein the second level is a production level of software development.

4. The method of claim 1, wherein, for the at least one of the one or more software modules that satisfies the one or more promotion criteria, the one or more promotion criteria include the code coverage metric being equal to or greater than a previously determined code coverage metric for the respective software module.

5. A computer-implemented method, comprising:
retrieving a plurality of unit code coverage reports describing one or more software modules covered by a unit test;
receiving system code coverage reports that include test data describing interactions between the one or more software modules and system software, wherein the one or more software modules are integrated into the system software, and wherein the test data further describes test results from the integration of the one or more software modules into the system software;
employing at least one processor to compute code coverage metrics for the one or more software modules, wherein the code coverage metrics are based at least on both the plurality of unit code coverage reports and the system code coverage reports; and
promoting at least one of the one or more software modules from a first level to a second level within a software deployment hierarchy, wherein said promoting is based at least in part on a determination that a code coverage metric of the code coverage metrics for the at least one of the one or more software modules satisfies one or more promotion criteria.

6. The method of claim 5, wherein the one or more promotion criteria include the code coverage metric being at least a predetermined code coverage threshold level.

7. The method of claim 6, wherein the code coverage threshold level is predetermined based at least in part on the second level.

8. The method of claim 6, wherein the code coverage threshold level is predetermined based at least in part on a category of the at least one of the one or more software modules.

9. The method of claim 6, wherein the code coverage threshold level is based at least in part on a characteristic of the second level, and wherein higher levels of the software deployment hierarchy are associated with higher code coverage threshold levels.

10. The method of claim 5, wherein the one or more promotion criteria include the code coverage metric being equal to or greater than a previously determined code coverage metric for the at least one of the one or more software modules.

11. The method of claim 5, further comprising reporting the at least one of the one or more software modules based at least in part on a determination that the code coverage metric for the at least one of the one or more software modules does not satisfy the one or more promotion criteria.

12. A system, comprising:
a memory;
at least one processor in communication with the memory; and
a promotion management component stored in the memory and executed by the at least one processor to:
retrieve a plurality of unit code coverage reports describing one or more software modules covered by a unit test;
receive system code coverage reports that include test data describing interactions between the one or more software modules and system software, wherein the one or more software modules are integrated into the system software, and wherein the test data further describes test results from the integration of the one or more software modules into the system software;
compute code coverage metrics for the one or more software modules, wherein the code coverage metrics are based at least on both the plurality of unit code coverage reports and the system code coverage reports; and
promote at least one of the one or more software modules within a software deployment hierarchy, wherein a promotion is based at least in part on a code coverage metric of the code coverage metrics for the at least one of the one or more software modules satisfying one or more promotion criteria.

13. The system of claim 12, wherein the code coverage metric indicates a proportion of lines of code of a respective software module covered by one or more executed tests.

14. The system of claim 12, wherein the code coverage metric indicates a proportion of branches of code of a respective software module covered by one or more executed tests.

15. The system of claim 12, wherein the code coverage metric indicates a proportion of functions of a respective software module covered by one or more executed tests.

16. The system of claim 12, further comprising at least one network interface, and wherein the plurality of unit code coverage reports are retrieved via the at least one network interface.

17. The system of claim 12, further comprising one or more computing devices configured to execute tests of the one or more software modules and generate the plurality of unit code coverage reports, and wherein the promotion management component further operates to receive the plurality of unit code coverage reports from the one or more computing devices.

18. The system of claim 17, wherein the executed tests include at least one of a unit test, an integration test, an environment test, a performance test, a load test, or a resilience test of the one or more software modules.

19. The system of claim 12, wherein the promotion management component computes the code coverage metric for each of the one or more software modules based on a determination that a code coverage report has been updated for a respective software module.

20. The system of claim 12, wherein the one or more promotion criteria include the code coverage metric being at least a code coverage threshold level that is predetermined based on an amount of time a respective software module has been deployed in production.

21. One or more non-transitory, computer-readable storage media storing instructions that, when executed, instruct at least one processor to perform actions comprising:

retrieving a plurality of unit code coverage reports describing test data for one or more software modules;

receiving system code coverage reports that include test data describing interactions between the one or more software modules and system software, wherein the one or more software modules are integrated into the system software, and wherein the test data further describes test results from the integration of the one or more software modules into the system software;

computing code coverage metrics for the one or more software modules, wherein the code coverage metrics are based at least on both the plurality of unit code coverage reports and the system code coverage reports; and promoting at least one of the one or more software modules to production, wherein said promoting is based at least in part on a determination that a code coverage metric of the code coverage metrics for the at least one of the one or more software modules satisfies one or more promotion criteria.

22. The one or more non-transitory, computer-readable storage media of claim 21, wherein the one or more promotion criteria include the code coverage metric being at least a code coverage threshold level that is predetermined based on a respective software module being at least one of a front-end or a back-end module.

23. The one or more non-transitory, computer-readable storage media of claim 21, wherein the one or more promotion criteria include the code coverage metric being at least a code coverage threshold level that is predetermined based on a number of dependencies between a respective software module and other software modules.

24. The one or more non-transitory, computer-readable storage media of claim 21, wherein the one or more promotion criteria include the code coverage metric being at least a code coverage threshold level that is predetermined based on an age of a respective software module.

25. The one or more non-transitory, computer-readable storage media of claim 21, wherein the one or more promotion criteria include the code coverage metric being at least a code coverage threshold level that is predetermined based on a respective software module being a critical software module.

* * * * *